June 27, 1933.  O. SVENSSON  1,915,583

APPARATUS FOR SPREADING FLY KILLING LIQUIDS ON A CARRIER

Filed Nov. 22, 1927

Patented June 27, 1933

1,915,583

UNITED STATES PATENT OFFICE

OSKAR SVENSSON, OF DAGLOSEN, SWEDEN

APPARATUS FOR SPREADING FLY-KILLING LIQUIDS ON A CARRIER

Application filed November 22, 1927, Serial No. 235,106, and in Sweden November 27, 1926.

The usual fly-catching devices for use with a sticky substance or liquid, to which flies adhere, are not suitable in humane and sanitary respects, owing to the fact that the flies, having stuck fast, are tortured during a long period before they die, and after they have collected in any great number are liable to create a noxious odor. In order to remove the said drawbacks a killing liquid may be used, to which the flies no not stick but which kills the same in a short time, whereupon they fall down on the floor, from which they may then be swept away.

The killing liquid must be not too thin and consists for instance of lubricating oil or generally a distillate from the hydrocarbon group containing a substance noxious to flies and similar insects dissolved or mixed in the oil or distillate. The active ingredient may consist for instance of ordinary insect powder or an extract of the same, produced for instance by treating the powder with petroleum oil until the oil extracts the poisonous resin of the powder the extract being then strained to remove the inactive constituents. The said extract kills the flies after they have come into contact with the same.

For spreading the killing liquid on a surface the apparatus shown in a side view in the accompanying drawing may be used.

The said apparatus comprises a receptacle for the liquid and provided in its bottom with a pipe 2 with a wick 3. In the lower end of the pipe 2 a strip 5 of veneer and provided with transverse grooves to give increased surface is fixed by means of a pin 4. A receptacle 6 with cover 7 is suspended in the lower end of the strip. The said cover 7 has an opening 8.

Liquid of the character stated above is supplied in the receptacle 1 and drawn up by the wick 3 and then passes by drops to the strip 5, on which it is spread and trickles downwards, until it finally drops into the receptacle 6 through the opening 8. The liquid gathered in the receptacle 6 is emptied into the receptacle 1, when necessary. As flies and similar insects contact with the strip 5, liquid will adhere to their legs and body, the flies soon die. Owing to the fact that the liquid trickles continuously downwards on the strip, the latter is always kept wet and the apparatus is always operative in opposition to the sticky fly-catchers which get dry very soon and become useless.

The apparatus may evidently be modified in some respects. For instance a valve may be substituted for the wick. The liquid carrier extending downwards from the receptacle 1 may consist of a spiral wire or a plaited wire or of a rod of metal or any other material and wound round with thread or other material.

I claim:

An apparatus for spreading fly-killing liquid, comprising a liquid container, a spout in the container extending with the upper end above the surface of the liquid and with its nozzle below the bottom of the container, a wick in the container reaching down through said spout to its nozzle, a band of solid material having one end secured in said nozzle and provided with fine transversely running corrugations, and a receptacle suspended from the lower end of the band, whereby liquid from said container is drawn from said container by the wick through the nozzle of the spout, spread over the corrugated surface of the band and ultimately collected in said receptacle.

In testimony whereof I have hereunto affixed my signature.

OSKAR SVENSSON.